Patented Apr. 6, 1926.

1,579,828

UNITED STATES PATENT OFFICE.

VLADISLAV MLADĚJOVSKY, OF PRAGUE, CZECHOSLOVAKIA.

PROCESS FOR PRODUCING A PREPARATION FOR TREATING ARTERIOSCLEROSIS.

No Drawing.   Application filed December 12, 1924.   Serial No. 755,563.

*To all whom it may concern:*

Be it known that I, Professor Dr. VLADISLAV MLADĚJOVSKY, citizen of the Czechoslovakian Republic, residing at Prague, Czechoslovakian Republic, have invented certain new and useful Improvements in a Process for Producing a Preparation for Treating Arteriosclerosis, of which the following is a specification.

The aqueous decoction of sundew, Drosera rotundifolia, is a well-known domestic remedy for treating arterio-sclerosis. In making this decoction, however, the effective substances, the proteolytic ferments, generally suffer, as they cannot stand such high temperatures.

The subject of the present invention is an extract of Drosera rotundifolia, in which the effective ferments are completely preserved and a process of making same.

According to the invention the extraction of finely ground Drosera is effected, instead of by boiling water, by an approximately ½% solution of silicate of sodium. For improving the taste a little sugar is added to the solution. The extraction must be carried out in such a manner that the free silicic acid remains in solution. The extract is thereupon inspissated in a vacuum, the temperature of 40° C. not being exceeded. The concentration is continued as long as the silicic acid remains in solution, a solution being obtained containing about one milligram $SiO_2$ per cubic centimeter. In its therapeutic effect the new preparation far exceeds the effect of silicate of sodium and the effect of an extract of Drosera.

What I claim is:

1. A process for producing a preparation of Drosera comprising subjecting finely ground Drosera to extraction with a solution of silicate of sodium, while avoiding the precipitation of the silicic acid, and thereupon inspissating the solution in a known manner in a vacuum to a state of concentration such that the silicic acid only just remains in solution.

2. As a new composition of matter, a concentrated extract of Drosera with a solution of sodium silicate, said extract containing about one milligram $SiO_2$ per cubic centimeter.

In testimony whereof I affix my signature.

Professor Dr. VLADISLAV MLADĚJOVSKY.